(12) United States Patent
Usukura et al.

(10) Patent No.: US 9,563,114 B2
(45) Date of Patent: Feb. 7, 2017

(54) DISPLAY DEVICE

(71) Applicant: Sharp Kabushiki Kaisha, Osaka (JP)

(72) Inventors: Naru Usukura, Osaka (JP); Hiromi Katoh, Osaka (JP); Takafumi Shimatani, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/891,948

(22) PCT Filed: May 16, 2014

(86) PCT No.: PCT/JP2014/063094
§ 371 (c)(1),
(2) Date: Nov. 17, 2015

(87) PCT Pub. No.: WO2014/188978
PCT Pub. Date: Nov. 27, 2014

(65) Prior Publication Data
US 2016/0139497 A1 May 19, 2016

(30) Foreign Application Priority Data

May 20, 2013 (JP) .................................. 2013-106418

(51) Int. Cl.
*G03B 21/604* (2014.01)
*G03B 27/42* (2006.01)
(Continued)

(52) U.S. Cl.
CPC ........... *G03B 21/604* (2013.01); *G02B 5/0278* (2013.01); *G02B 27/4205* (2013.01); *G03B 21/10* (2013.01);
(Continued)

(58) Field of Classification Search
CPC ..... G03B 21/56; G03B 21/625; G03B 21/604; G03B 21/602; G03B 3/08
(Continued)

(56) References Cited

U.S. PATENT DOCUMENTS

| 6,282,023 B1* | 8/2001 | Bergman | G03B 21/604 |
| | | | 359/449 |
| 6,288,803 B1* | 9/2001 | Hattori | G02B 5/32 |
| | | | 359/15 |
| 6,981,771 B1 | 1/2006 | Arai et al. | |
| 7,520,623 B2* | 4/2009 | Katase | G03B 21/10 |
| | | | 353/77 |
| 2003/0184830 A1* | 10/2003 | Takada | G02B 5/0252 |
| | | | 359/15 |
| 2004/0252373 A1* | 12/2004 | Umeya | G02B 5/3016 |
| | | | 359/449 |
| 2008/0088961 A1 | 4/2008 | Kushida | |
| 2015/0167934 A1* | 6/2015 | Noeth | F21V 14/04 |
| | | | 362/259 |

(Continued)

FOREIGN PATENT DOCUMENTS

JP           2003-5617 A     1/2003
JP        2003-294952 A    10/2003
(Continued)

*Primary Examiner* — William C Dowling
(74) *Attorney, Agent, or Firm* — Chen Yoshimura LLP

(57) ABSTRACT

A screen includes: a diffraction member and a scattering member. The diffraction member selectively diffracts image light and orients this light towards a viewer. In order for the image light to be scattered to a higher degree than ambient light that enters the scattering member on the side opposite of the viewer, the degree to which the scattering member scatters polarized light varies according to the polarization direction of the light. Thus, regardless of the positional relationship of the screen and a projector, which projects image light, it is possible to use a relatively simple industrial manufacturing process that can ensure the following to a satisfactory extent: brightness of the screen in the front direction, a wide viewing angle, and visual clarity through the screen.

6 Claims, 19 Drawing Sheets

(51) Int. Cl.
- G03B 5/02 (2006.01)
- G03B 21/20 (2006.01)
- G03B 21/10 (2006.01)
- G03B 21/62 (2014.01)
- G03B 21/602 (2014.01)
- G02B 5/02 (2006.01)
- G02B 27/42 (2006.01)

(52) U.S. Cl.
CPC ......... G03B 21/2073 (2013.01); G03B 21/602 (2013.01); G03B 21/62 (2013.01)

(58) Field of Classification Search
USPC .............................. 359/453, 454, 455, 460
See application file for complete search history.

(56) References Cited

U.S. PATENT DOCUMENTS

2015/0362728 A1* 12/2015 Tei ..................... G02B 5/3033
  353/20
2016/0274450 A1* 9/2016 Usukura ................ G02B 5/26

FOREIGN PATENT DOCUMENTS

| | | |
|---|---|---|
| JP | 3552706 B2 | 8/2004 |
| JP | 3552709 B2 | 8/2004 |
| JP | 3758358 B2 | 3/2006 |
| JP | 3895907 B2 | 3/2007 |
| JP | 4191223 B2 | 12/2008 |

* cited by examiner (a)

(b)

DISPLAY DEVICE

TECHNICAL FIELD

The present invention relates to a transmissive or reflective projection display device that includes a screen.

BACKGROUND ART

So-called "transparent screen" technology, in which a transparent screen displays images, has been well-known for some time. However, a screen that can ensure visual clarity through the screen (in other words, an image on the other side of the screen can be recognized as an image) while also ensuring a wide viewing angle and quality for images displayed on the screen does not currently exist. Thus, there are currently no transmissive or reflective projection display devices that include a high quality "transparent screen."

The reasons for this will be described below.

In order to generate images on a screen, it is necessary to scatter light on the screen. Additionally, in order to ensure a wide viewing angle, it is necessary to increase the degree of light-scattering to a certain extent. When light is scattered, however, visual clarity through the screen declines.

This is due to the fact that it is difficult to both a) scatter light while ensuring image quality and a wide viewing angle, and b) ensure visual clarity through the screen, since there is a fundamental trade-off that exists between these two concepts.

Conventionally, there have been many transparent screens developed that included a scattering layer in which a scattering agent was spread across a transparent supporting substrate. Since the scattering layer by itself does not scatter enough light, transparent screens that further included a diffraction member (diffraction sheet) such as a holographic film were developed.

FIG. 18 illustrates a schematic configuration of a conventional transmissive projection display device 100.

As shown in FIG. 18, the conventional transmissive projection display device 100 includes: a screen 101; and a projector 104 that projects projector light onto the screen 101.

In addition, the screen 101 includes a diffraction member 102 and a scattering member (scattering sheet) 103.

The diffraction member 102 diffracts light so that projector light from the projector 104 can be efficiently oriented in the front direction of the screen 101. Since diffraction selectivity can be set in regards to the wavelength and angle of incidence of light, it is possible to selectively diffract only projector light while not diffracting any ambient light.

While it is possible to orient light towards the front by diffraction alone, diffraction by itself is not enough to disperse light to obtain a wide viewing angle (this ability is also known as a "scattering function"). Thus, by providing a scattering member 103, light is dispersed and a wide viewing angle can be ensured.

However, scattering members 103 included in conventional transmissive projection display devices 100 scatter both projector light from the projector 104 and ambient light, regardless of the polarization direction of the light. Thus, while a wide viewing angle can be obtained, it is not possible to ensure visual clarity through the screen 101, which is a problem.

In order to resolve such problems, Patent Document 1 discloses a holographic screen that includes a light-scattering element that only scatters light that enters from within a prescribed range of angles of incidence.

FIG. 19 illustrates a schematic configuration of a conventional holographic screen 201 disclosed in Patent Document 1.

As shown in FIG. 19, the holographic screen 201 includes: a holographic element 211 that has a function of diffracting projected light 221 that has been projected by a projection device 202; and a light scattering element 212. The light scattering element 212 is disposed on the projection device 202 side of the holographic element 211, which is the side of the holographic element 211 that is opposite of the viewer 206 side, with an adhesive layer 213 interposed therebetween.

By scattering incident light whose angle of incidence falls within a prescribed range, the light scattering element 212 can selectively scatter only projected light 221 projected by the projection device 202 and avoid scattering any ambient light.

Therefore, it is possible to obtain a wide viewing angle while at the same time ensuring visual clarity through the screen.

Patent Document 2 discloses a holographic screen that includes a directional scattering hologram that corresponds to the light scattering element 212 described in Patent Document 1.

Similar to the light scattering element 212 in Patent Document 1, it is necessary for the degree to which this directional scattering hologram scatters light to vary according to the angle of incidence of the incident light. It is therefore extremely difficult to industrially produce such a hologram and such a process is very expensive.

Patent Document 3 discloses a holographic screen in which the haze level is limited to a predetermined range.

Patent Document 4 discloses an alignment film that has selectivity with respect to the polarization direction of linearly polarized light, or in other words, has a transmission axis (a direction in which the least amount of scattering occurs) and a scattering axis (a direction in which the largest amount of scattering occurs) on the surface of the film.

In the screen disclosed in Patent Document 4, the alignment film and a polarizing element are stacked on each other, a dichroic polarizing plate is used as the polarizing element, and the alignment film and the polarizing plate are stacked such that the transmission axis of the alignment film matches the absorption axis of the dichroic polarizing plate. The scattering axis direction of the alignment film matches the polarization direction of light exiting from a liquid crystal projector.

Patent Document 4 discloses that, as a result of this configuration, it is possible to effectively scatter linearly polarized light that contributes to forming images and obtain a bright display while suppressing scattering of light in the transmission direction, which is not related to forming images, and also possible to absorb polarized light via the dichroic polarizing plate; thus, it is possible to display high contrast images.

RELATED ART DOCUMENTS

Patent Documents

Patent Document 1: Japanese Patent No. 3552706 (Published on Aug. 11, 2004)

Patent Document 2: Japanese Patent Application Laid-Open Publication, "Japanese Patent Application Laid-Open Publication No. 2003-294952 (Published on Oct. 15, 2003)"

Patent Document 3: Japanese Patent No. 3552709 (Published on Aug. 11, 2004)

Patent Document 4: Japanese Patent No. 4191223 (Published on Dec. 3, 2008)

Patent Document 5: Japanese Patent No. 3758358 (Published on Mar. 22, 2006)

Patent Document 6: Japanese Patent Application Laid-Open Publication, "Japanese Patent Application Laid-Open Publication No. 2003-5617 (Published on Jan. 8, 2003)"

Patent Document 7: Japanese Patent No. 3895907 (Published on Mar. 22, 2007)

SUMMARY OF THE INVENTION

Problems to be Solved by the Invention

However, since it is necessary for the light scattering element 212, which is included in the holographic screen 201 disclosed in Patent Document 1, to vary the degree of scattering in accordance with the angle of incidence of incident light, it is extremely difficult to create such a light scattering element and such a process is very expensive.

Similar to the light scattering element 212 disclosed in Patent Document 1, it is necessary for the directional scattering hologram disclosed in Patent Document 2 to vary the degree of scattering in accordance with the angle of incidence of incident light; therefore it is extremely difficult to create such a light scattering hologram and such a process is very expensive.

In addition, it is not possible to ensure a wide viewing angle to a satisfactory extent while ensuring visual clarity through the screen by using the holographic screen disclosed in Patent Document 3, which limited the haze level to a predetermined range.

In a screen that includes the alignment film disclosed in Patent Document 4, there are no major problems if the liquid crystal projector is disposed such that, for light emitted from the liquid crystal projector, the angle of incidence between the light and a direction orthogonal to the screen falls within a predetermined range. If the angle of incidence between the light and the direction orthogonal to the screen does not fall within the predetermined range and becomes large, the brightness in the front direction of the screen decreases (although this is not a major problem).

If, in order to resolve this problem, the liquid crystal projector is disposed such that the angle of incidence of light from the liquid crystal projector falls within the predetermined range, it is possible that a viewer may see the liquid crystal projector when a transmissive screen is being used. In addition, the distance between the projector and the screen becomes very large, which leads to concern about having to use such a wide space between these two components. Furthermore, the liquid crystal projector is disposed in a location near the viewer when a reflective screen is used.

Patent Document 4 also discloses a screen that includes a multilayer film that has an alignment film and a polarizing element.

While high contrast images can be displayed and a wide viewing angle can be ensured by using a screen that includes such a multilayer film, other problems can occur in both transmissive screens and reflective screens. In the case of transmissive screens, it is possible that a viewer may see the projector, while in the case of reflective screens, the liquid crystal projector is disposed near the viewer and it is difficult to ensure visual clarity through the screen.

An object of the present invention is to provide a transmissive or reflective display device that can be relatively easily manufactured and that includes a screen that, regardless of the positional relationship of the screen and an image light projection unit that projects image light, can ensure brightness in the front direction of the screen, a wide viewing angle, and visual clarity through the screen to a satisfactory extent.

Means for Solving the Problems

This display device includes: a projector that projects image light; and a screen that receives the image light from the projector and transmits or reflects the image light towards a viewer so as to make an image formed by the image light visible to the viewer, wherein the screen includes a diffraction sheet and a scattering sheet, the diffraction sheet diffracting the image light from the projector and directing the image light toward the viewer, and wherein, the scattering sheet and the projector are configured such that a degree of scattering at the scattering sheet varies according to a polarization direction of incoming light and that the degree of scattering is higher for the image light from the projector than for ambient light that enters the scattering sheet from a side of the scattering sheet opposite to a side facing the viewer.

It is well known that s-polarized light is the dominant form of light in ambient light that has been reflected by objects.

Here, ambient light refers to light other than the above-mentioned image light.

The screen included in the above-mentioned display device includes a diffraction member and a scattering member. The diffraction member selectively diffracts the image light and orients the image light toward the viewer. The degree of scattering by the scattering member varies according to the polarization direction of light such that image light is scattered more than ambient light that enters the scattering member from the side opposite of the viewer.

In other words, the degree of scattering by the scattering member varies according to the polarization direction of light such that s-polarized light, which is predominant in light reflected by objects, is not scattered to a large extent while image light, which includes different types of light with various polarization directions such as s-polarized light and p-polarized light, is scattered to a large extent.

Therefore, a wide viewing angle can be obtained and visual clarity through the screen can be ensured to a satisfactory extent.

Conventionally, in order to obtain a wide viewing angle and ensure visual clarity through the screen to a satisfactory extent, it was necessary to vary the degree of scattering in the light scattering element, the directional scattering hologram, or the like, according to the angle of incidence of the incident light. This was extremely difficult to do, which meant that the process was very expensive. In the above-mentioned configuration of the present invention, however, since the degree of scattering may vary according to the polarization direction of the light, such a screen can be manufactured relatively easily compared to conventional light scattering elements, directional scattering holograms, and the like.

Since the above-mentioned screen includes a diffraction member that selectively diffracts image light and orients the light toward the viewer, brightness in the front direction of the screen can be ensured regardless of the positional relationship between the screen and the image light projection unit that projects image light.

Thus, this display device can be relatively easily manufactured without concern for the positional relationship of the screen and the image light projection unit that projects image light, while brightness in the front direction of the screen can be ensured, a wide viewing angle can be obtained, and visual clarity through the screen can be ensured to a satisfactory extent.

Effects of the Invention

According to at least one aspect of the present invention, it is possible to produce a transmissive or reflective display device that can be relatively easily manufactured without concern for the positional relationship of the screen and the image light projection unit that projects image light, and that includes a screen that can ensure brightness in the front direction of the screen, obtain a wide viewing angle, and ensure visual clarity through the screen to a satisfactory extent.

DETAILED DESCRIPTION OF EMBODIMENTS

Embodiments of the present invention will be explained hereafter in detail with reference to the drawings. However, dimensions, materials, shapes, positional relationships, and the like of constituting members described in these embodiments are merely individual embodiment examples, and the scope of the present invention shall not be narrowly interpreted by being limited thereto.

Embodiments of the present invention will be explained below using FIGS. 1 to 17.

<Embodiment 1>

The present embodiment will be explained hereafter using FIGS. 1 to 5.

Figure 1:
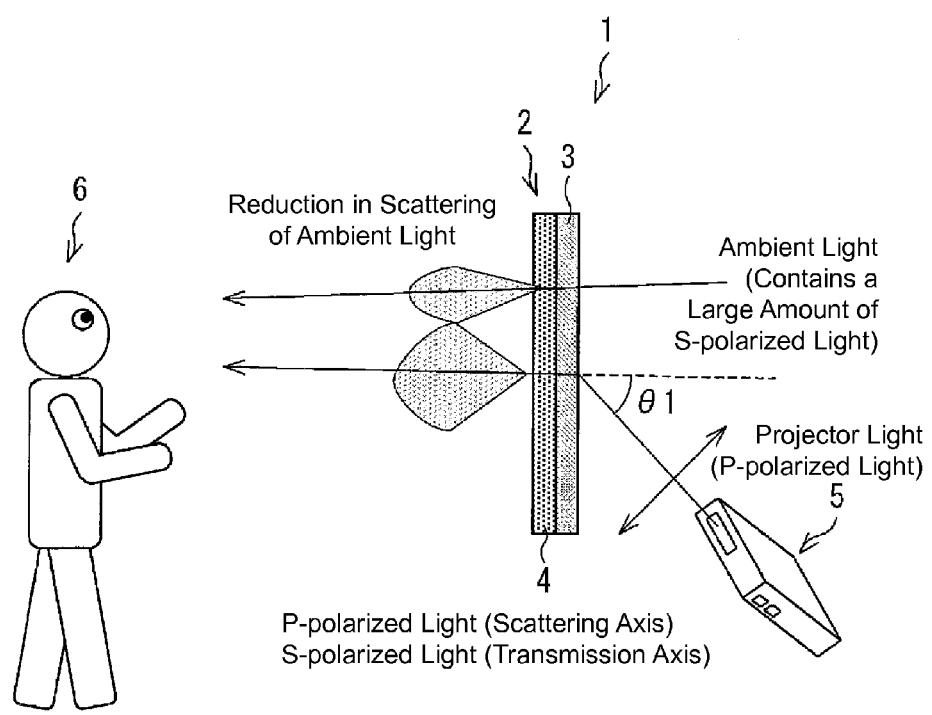
FIG. 1 shows a schematic configuration of a transmissive projection display device of Embodiment 1.

FIG. 1 shows a schematic configuration of a transmissive projection display device 1.

As shown in FIG. 1, the transmissive projection display device 1 includes a screen 2, and a projector 5 that projects projector light onto the screen 2.

Since the projection display device 1 is transmissive, the projector 5 is disposed on one side of the screen 2 and a viewer 6 is located on the other side of the screen 2.

The screen 2 includes a diffraction member 3 and a scattering member 4.

The diffraction member 3 can efficiently diffract projector light from the projector 5 and orient the light toward the front of the screen 2. Since diffraction can be made selective with respect to the wavelength and angle of incidence of light, it is possible to selectively diffract the projector light while not diffracting any ambient light.

However, while diffraction alone is sufficient to orient light in the front direction of the screen, it is not sufficient to disperse light to provide a wide viewing angle (a scattering function). Thus, by providing the scattering member 4, light is dispersed and a wide viewing angle is ensured.

However, as is the case with conventional technology, when projector light from the projector 5 and ambient light are scattered regardless of the polarizing direction thereof, a wide viewing angle can be obtained, but visual clarity cannot be ensured through the screen 2.

As a countermeasure, by using, as the scattering member 4, a scattering film (polarized light scattering film) that has polarized light scattering anisotropic characteristics (in which the degree of scattering varies according to the polarization direction of light), or in other words, a scattering film in which p-polarized light passes along the scattering axis and s-polarized light passes along the transmission axis, and making the projector light from the projector 5 p-polarized light that moves along the scattering axis of the scattering film, it is possible to efficiently scatter the projector light while suppressing scattering of ambient light.

Specifically, since s-polarized light accounts for most of the light reflected by objects, the amount of object-reflected light that is scattered and viewed through the screen by the viewer can be reduced. In addition, by scattering p-polarized light, which is what the projector light mainly consists of, it is possible to create a projection display device 1 in which a wide viewing angle and visual clarity through the screen can be ensured to a satisfactory extent.

In the present embodiment, an example was used in which the projector light from the projector 5 was p-polarized light in order to increase the selectivity between the polarization component scattered by the scattering member 4 and the polarization component transmitted by the scattering member 4. If the degree of scattering by the scattering member 4 can be made to vary according to the polarization direction of light such that the degree to which the projector light, which includes various types of light such as s-polarized light and p-polarized light, is scattered is higher than the degree of scattering of the object-reflected light (ambient light) that enters the side of the scattering member 4 that is opposite of the viewer 6, and if the selectivity between the polarization component scattered by the scattering member 4 and the polarization component transmitted by the scattering member 4 can be ensured, it is not necessary for the projector light from the projector 5 to be p-polarized light.

As shown in FIG. 1, ambient light and the projector light (p-polarized light) both enter the scattering member 4 via the diffraction member 3, and light that is transmitted and scattered by the scattering member 4 is viewed by the viewer 6.

It was stated above that, since ambient light generally consists of mostly s-polarized light and it is possible to increase the selectivity of the scattering member 4 with respect to ambient light, it is preferable that p-polarized light be used as the projector light from the projector 5. However, there are additional benefits to using p-polarized light as the projector light, such as being able to increase the usage efficiency of the light.

Figure 2:
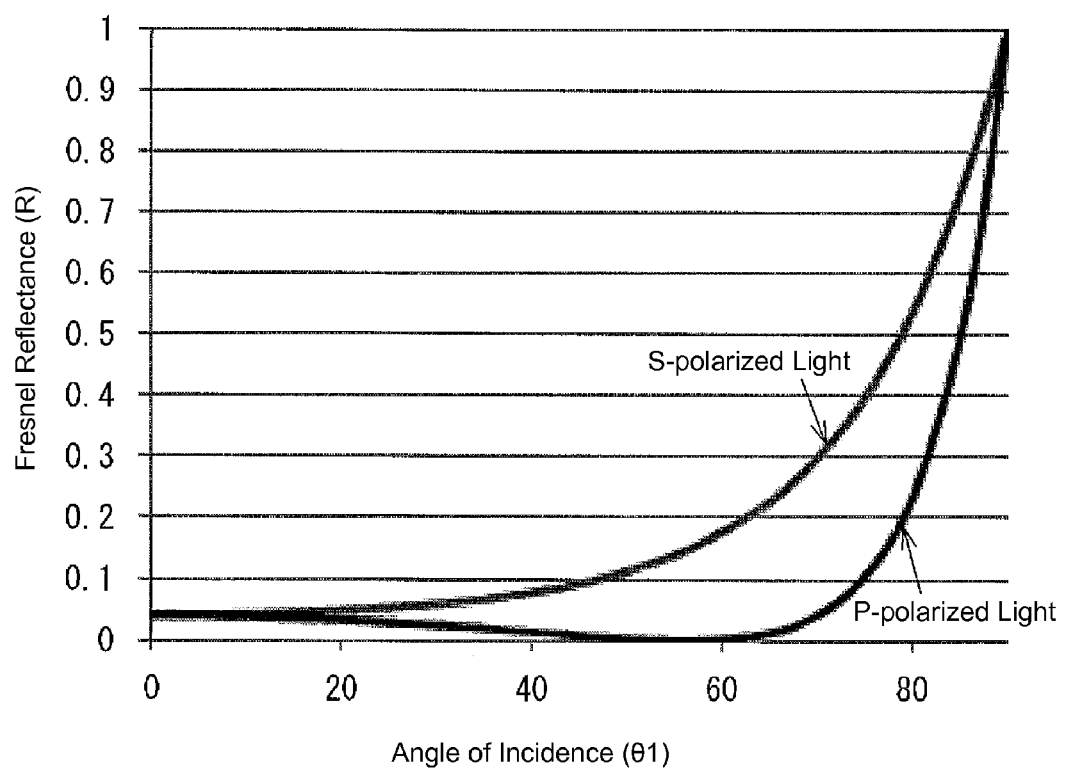
FIG. 2 illustrates Fresnel reflectance R for respective angles of incidence (θ1) toward the screen for p-polarized light and s-polarized light.

FIG. 2 shows Fresnel reflectance R for respective angles of incidence (θ1) toward the screen 2 for p-polarized light and s-polarized light.

As shown in FIG. 1, the angle of incidence (θ1) toward the screen 2 is the angle formed between a direction perpendicular to the screen 2 and the incident light.

As shown in FIG. 2, when the angle of incidence (θ1) is greater than or equal to a prescribed angle (approximately 20 degrees), the Fresnel reflectance when light enters the screen 2 is smaller for p-polarized light than s-polarized light.

Therefore, in the present embodiment, by using p-polarized light as the projector light from the projector 5, Fresnel reflectance that occurs when projector light enters the diffraction member 3 included in the screen 2 can be prevented, and the usage efficiency of the light can be increased.

As in the present embodiment, in cases such as those in which the projector 5 is disposed near the screen 2 and the angle of incidence (θ1) between the projector light from the projector 5 and the screen 2 is large, there is an even larger reduction in the Fresnel reflectance by using p-polarized light.

Figure 3:
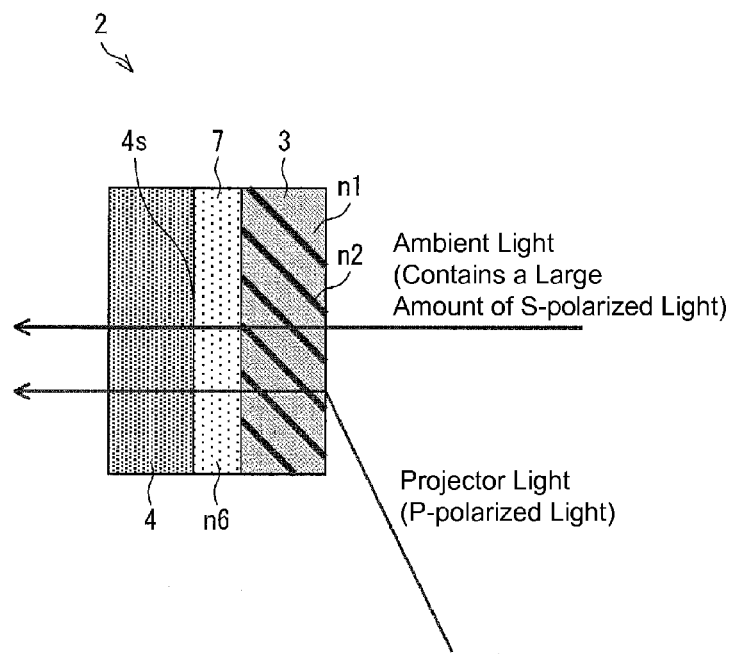
FIG. 3(a) shows a schematic configuration of a screen included in the transmissive projection display device shown in FIG. 1.
FIG. 3(b) shows a schematic configuration of a scattering member included in the screen.
Figure 3:
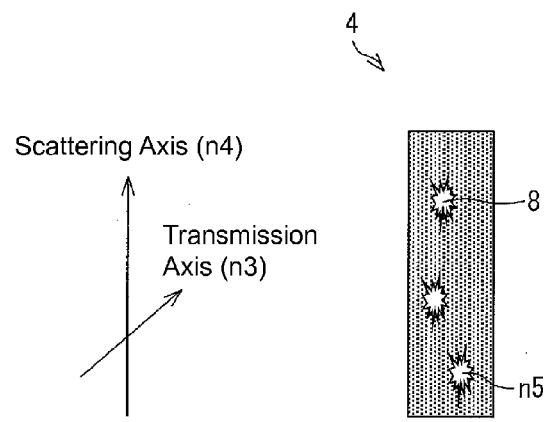

FIG. 3(*a*) shows a schematic configuration of the screen 2 included in the transmissive projection display device 1. FIG. 3(*b*) shows a schematic configuration of the scattering member 4 included in the screen 2.

As shown in FIG. 3(*a*), in the present embodiment, a hologram is used as the diffraction member 3, the hologram has a structure in which two layers with different refractive indices (n1, n2) are stacked, and diffraction occurs as a result of this difference in the refractive indices of the two layers.

In addition, an adhesive agent 7 with a refractive index of n6 is provided between the diffraction member 3 and the scattering member 4.

Furthermore, as shown in FIG. 3(*b*), the refractive index in the scattering film (polarized light scattering film) used as the scattering member 4 is anisotropic, and the film base material has a refractive index of n3 in the transmission axis direction in FIG. 3(*b*) and a refractive index of n4 in the scattering axis direction in FIG. 3(*b*).

That light-scattering microparticles 8 with a refractive index of n5 exist within such a film base material in which the refractive index is anisotropic makes it possible to scatter polarized light.

In other words, the film can be made to have the ability to scatter polarized light by having the refractive indices n3, n4, and n5 satisfy Formula 1 below:

$$|n4-n5|>|n3-n5| \quad \text{Formula 1}$$

Patent Document 4 discloses a method in which the polarized light scattering anisotropic properties (properties in which the degree of scattering varies according to the polarization direction of light) of the scattering film (polarized light scattering film) are expressed.

An adhesive agent 7 with a refractive index of n6 is provided between the diffraction member 3 and the scattering member 4. In order to reduce reflectivity at the interface of the diffraction member 3 and the scattering member 4, it is preferable that the difference in the refractive indices be reduced by the adhesive agent 7 and the like.

Upon consideration of the polarized light scattering anisotropic properties of the scattering member 4, it is preferable that the effect of the interface on the transmission axis be reduced, and thus the scattering axis may be configured so as to be more largely affected by the interface. In fact, it is possible to further promote light scattering by increasing the effect of the interface along the scattering axis.

Figure 4:
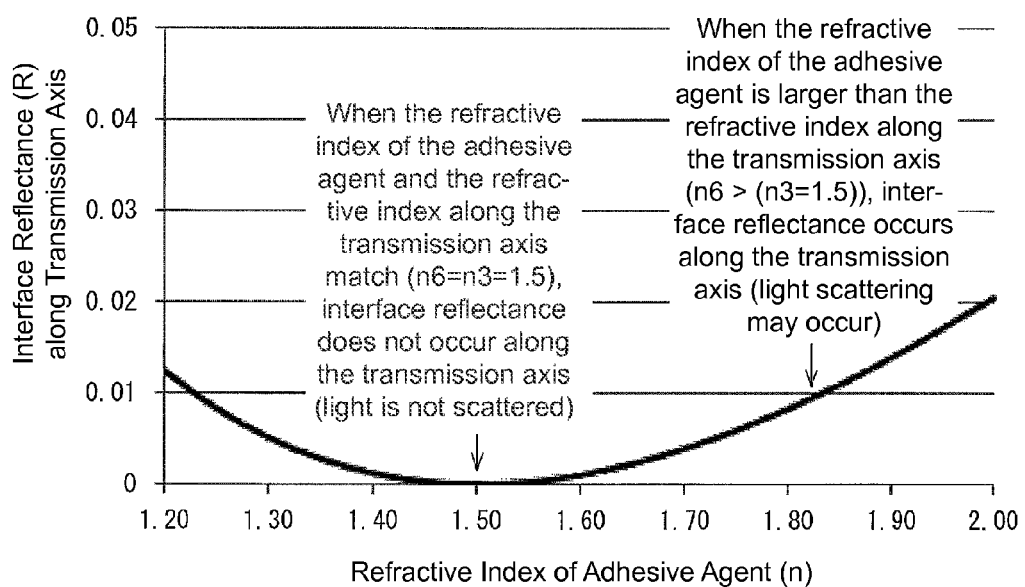
FIG. 4 shows an interface reflectance R along the transmission axis of the scattering member that is a result of variations in the refractive index of an adhesive agent when the refractive index n3 of the scattering member in the transmission axis direction is set to 1.50.

FIG. 4 shows an interface reflectance R along the transmission axis of the scattering member that is due to variations in the refractive index of the adhesive agent when the refractive index n3 of the scattering member in the transmission axis direction is set to 1.50.

As shown in FIG. 4, when the refractive index n6 of the adhesive agent is the same (1.50) as the refractive index in the transmission axis direction of the scattering member, interface reflectance does not occur along the transmission axis direction and light scattering also does not occur.

Meanwhile, as the refractive index n6 of the adhesive agent becomes larger than the refractive index n3 of the scattering member in the transmission axis direction, the interface reflectance increases along the transmission axis, and it becomes more likely that light scattering will occur.

Therefore, it is preferable that the refractive index n6 of the adhesive agent 7 satisfy Formula 2 below, and it is even more preferable that the refractive index n6 of the adhesive agent 7 be identical to the refractive index n3 of the scattering member 4 in the transmission axis direction.

$$|n3-n6|<|n4-n6| \quad \text{Formula 2}$$

Thus, if the refractive index n6 of the adhesive agent 7 satisfies Formula 2 above, it is possible for projector light from the projector 5 to be effectively scattered by providing a physical pattern on a front surface 4*s* (see FIG. 3) on the adhesive agent 7 side of the scattering member 4.

One example of surface treatment for forming the above-mentioned physical pattern is to form parallel vertical lenticular lenses when forming the scattering film as the scattering member 4.

Figure 5:
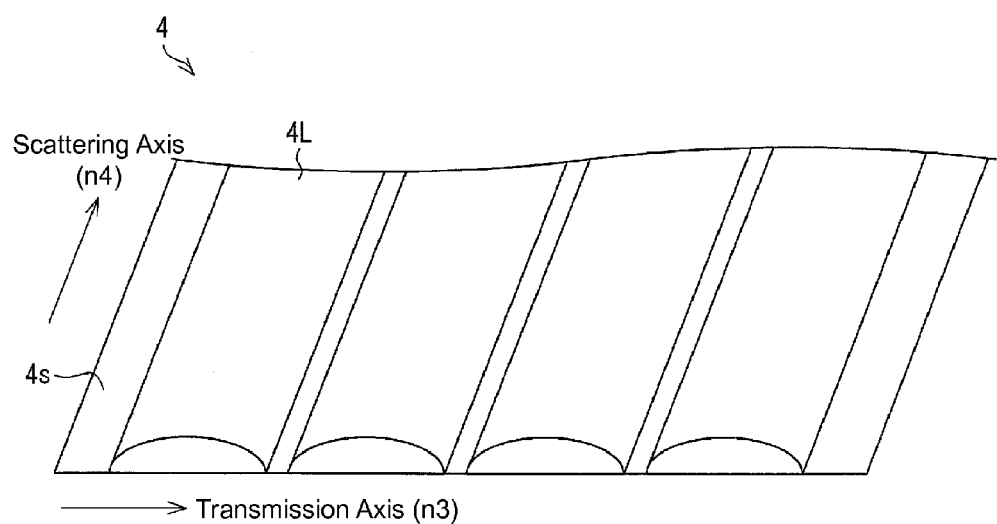
FIG. 5 illustrates a pattern that forms parallel vertical lenticular lenses on the interface on the adhesive agent side of a scattering member included in the transmissive projection display device shown in FIG. 1.

FIG. 5 shows a pattern in which parallel vertical lenticular lenses 4L are formed on the front surface 4*s* on the adhesive agent 7 side of the scattering member 4.

As shown in FIG. 5, by including the parallel vertical lenticular lenses (a light distribution control member) 4L, lens action can be effectively carried out on polarized light (in other words, projector light [p-polarized light] from the projector 5) in the scattering axis direction; thus, it is possible to efficiently increase the viewing angle in the horizontal direction.

Thus, by causing the front surface 4s to have a scattering effect, it is possible to extend the optical path length of light that enters the interior of the scattering member 4 and more effectively cause light to be scattered. If such a configuration is used, it is easier to control the viewing angle on the light-exiting side of the screen 2.

In the present embodiment, an example was described in which lenses were used as optical (physical) shapes for controlling light distribution. The present invention is not limited to such an example, however, and the optical shape for controlling light distribution may be a prism or the like.

In the present embodiment, an acrylic adhesive agent (with a refractive index of 1.56) was used as the adhesive agent 7. However, a silicon adhesive agent, an epoxy adhesive agent, or the like may be used as the adhesive agent 7.

In the present embodiment, a PET (polyethylene terephthalate) base material, in which the refractive index n3 in the transmission axis direction was 1.6 and the refractive index n4 in the scattering axis direction was 1.75, was used as a scattering film (polarized light scattering film) base material for the scattering member 4. However, as long as the material has polarized light scattering anisotropic properties (in other words, properties in which the degree of scattering varies according to the polarization direction of the light), there are no particular restrictions as to what material is used.

In the present embodiment, the hologram used as the diffraction member 3 is provided with a protective film (not shown in FIGS. 1 and 3(*a*)) to increase strength and reliability. This protective film may be disposed on the hologram via an adhesive.

In the present embodiment, a configuration was described in which the diffraction member 3 and the scattering member 4 are attached by applying an adhesive agent 7 across the entire surfaces thereof. However, a configuration may be used in which the adhesive agent 7 is formed only on the edges or the like instead of the entire surface.

In the projection display device 1 of the present embodiment, a projector 5 was used as an image light projection unit that projects image light onto the screen 2, but the present invention is not limited to such a configuration.

There are a variety of different types of projectors. When consideration is given to polarization and the diffraction efficiency of holograms, it is preferable to use a projector that utilizes a laser light source that can control polarization and wavelength.

The projector 5 used as the image light projection unit in the present embodiment was a type of projector that used a laser pico projector that included a MEMS mirror. Alternatively, a lens imaging optic projector that utilizes lenses may be used. In such a case, a polarizing plate, a wire grid polarizing plate, or the like may be used in order to control polarization.

A light source other than a laser light source may be used as the light source for the projector. For example, a high pressure mercury lamp or the like can be used.

In the present embodiment, projector light that reaches the screen 2 is bent toward the front of the screen 2 via a holographic film that functions as the diffraction member 3. It is also possible to bend projector light by using blazed grating or the like as the diffraction member 3. However, in consideration of the ability to ensure visual clarity, it is preferable to use a holographic film as the diffraction member 3.

In the present embodiment, a holographic film that had high diffraction efficiency with respect to p-polarized light was used. The p-polarized light entered the holographic film as p-polarized light and then exited the holographic film as p-polarized light. In addition, the scattering member 4 was disposed such that the scattering axis of the scattering member 4 matched the polarization axis of the p-polarized light diffracted by the holographic film.

In addition, it is preferable that the holographic film simultaneously have both a prescribed diffraction function and a scattering function. As a result of such a configuration, the polarized light scattering anisotropic properties (properties in which the degree of scattering varies according to the polarization direction of the light) can be reduced, and such a configuration is also beneficial in that visual clarity can be improved.

Figure 6:
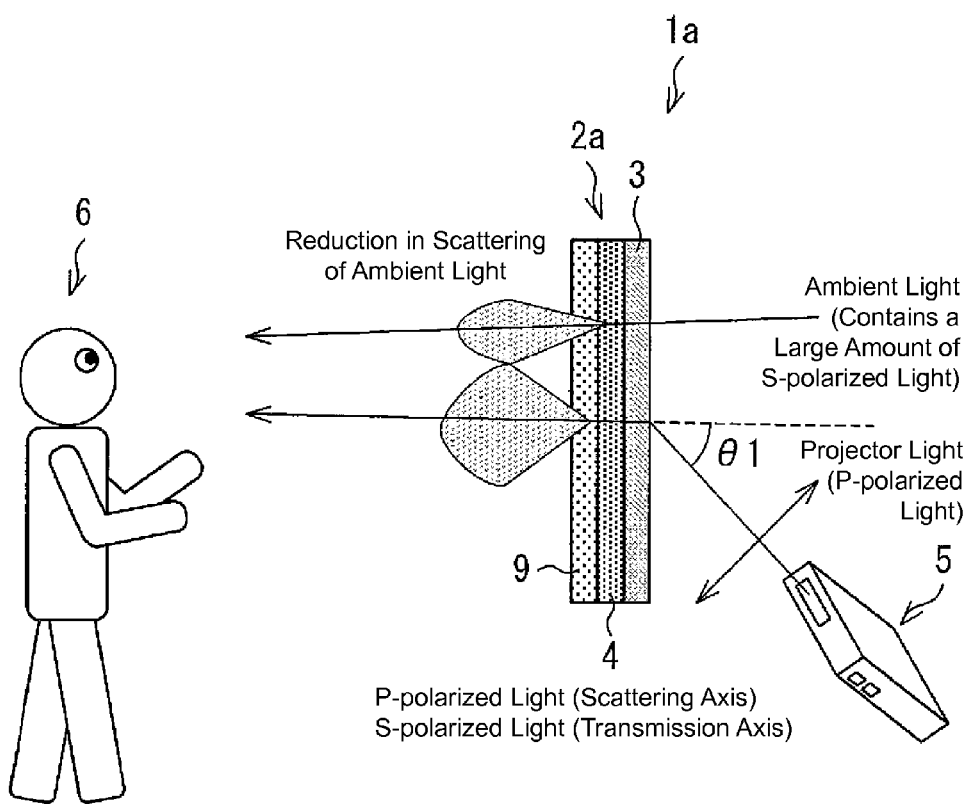
FIG. 6 shows a schematic configuration of a transmissive projection display device in which a retardation plate (a λ/4 plate) is provided on the light-exiting side of the screen as an addition to the configuration of the transmissive projection display device shown in FIG. 1.

FIG. 6 shows a schematic configuration of a transmissive projection display device 1a in which a retardation plate (λ/4 plate) 9 has been added to the light-exiting side of the screen 2a in the configuration of the transmissive projection display device 1 shown in FIG. 1.

As shown in FIG. 6, the retardation plate (λ/4 plate) 9 is provided on the light-exiting side of the screen 2a that is included in the transmissive projection display device 1a. As a result of such a configuration, light emitted from the retardation plate (λ/4 plate) 9 can be made circularly polarized, and the effect of polarized sunglasses on visibility can be suppressed.

<Embodiment 2>

Next, Embodiment 2 of the present invention will be explained using FIG. 7. A transmissive projection display device 1b of the present embodiment is different from the above-mentioned Embodiment 1 in that, within a holographic film used as a diffraction member 3a, the diffraction direction of projector light from a projector 5 is between 5 and 45 degrees up or down, for example. Other configurations are the same as described in Embodiment 1. For ease of description, members that have the same functions as members shown in the drawings of Embodiment 1 will be assigned the same reference characters, and descriptions thereof will be omitted.

As in the above-mentioned Embodiment 1, when light from a highly directive laser light source used in the projector 5 is substantially diffracted by the diffraction member 3 in a direction perpendicular to the screen 2, the light is not scattered, and an especially bright region, which a viewer may find to be too bright, appears within a narrow region (within 1 degree) in the front direction of the screen.

The transmissive projection display device 1b of the present embodiment can suppress the appearance of such a bright region.

Figure 7:
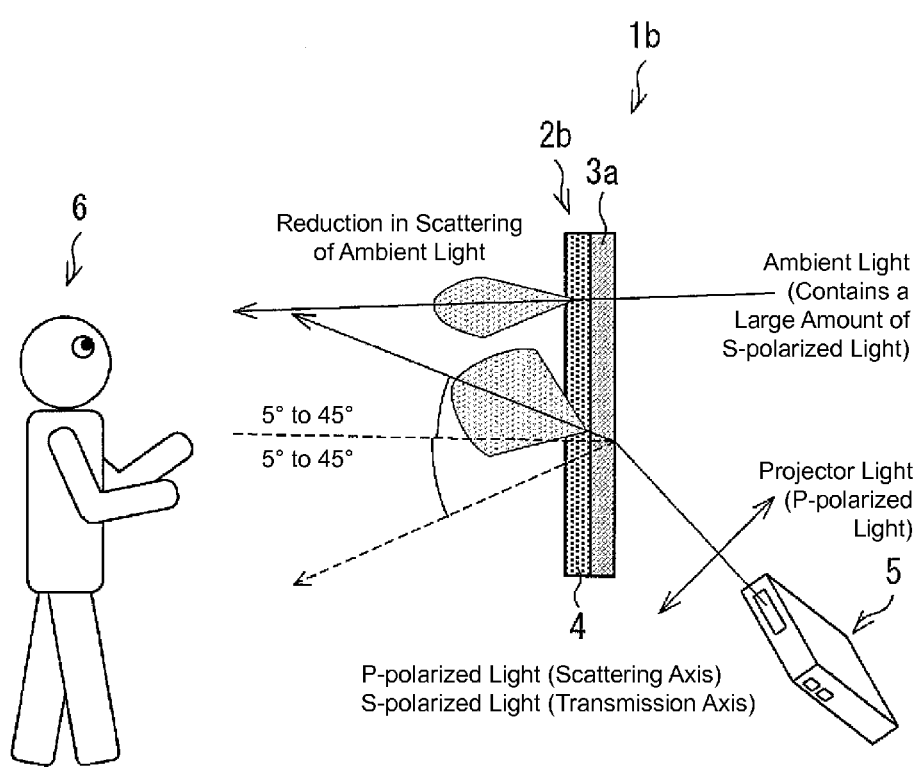
FIG. 7 shows a schematic configuration of a transmissive projection display device according to Embodiment 2.

FIG. 7 illustrates a schematic configuration of the transmissive projection display device 1b.

As shown in FIG. 7, in the holographic film used as the diffraction member 3a, the diffraction direction of projector light from the projector 5 is inclined between 5 and 45 degrees up or down with respect to a direction perpendicular to a screen 2b, for example.

In such a configuration, the peak brightness is inclined up or down by at least 5 degrees so that a viewer 6 is not directly facing the peak brightness; thus, especially bright regions, which the viewer 6 might consider to be too bright, that appear within a narrow region (1 degree or less) of the front direction of the screen 2b can be prevented from appearing.

In order to suppress the appearance of especially bright regions, it is preferable that the angle to which the diffraction direction of the projector light from the projector 5 is inclined with respect to the direction perpendicular to the screen is at least 5 degrees up or down. However, in consideration of issues such as balancing brightness in the front direction of the screen 2b, the angle may be appropriately set anywhere between 5 and 45 degrees up or down. When the angle is greater than 45 degrees up or down with respect to the direction perpendicular to the screen 2b, problems may occur in which brightness in the front direction decreases and light usage efficiency declines.

<Embodiment 3>

Next, Embodiment 3 of the present invention will be explained using FIG. 8. A transmissive projection display device 1c of the present embodiment differs from the above-mentioned Embodiment 1 in that the display device 1c further includes as a display unit 10 that emits s-polarized light: a liquid crystal display panel that includes a polarizing plate for emitting only s-polarized light and that is disposed on a topmost surface of a light-exiting face of the display unit; and a backlight. Other configurations are the same as described in Embodiment 1. For ease of description, members that have the same functions as members shown in the drawings of Embodiment 1 will be assigned the same reference characters, and descriptions thereof will be omitted.

Figure 8:
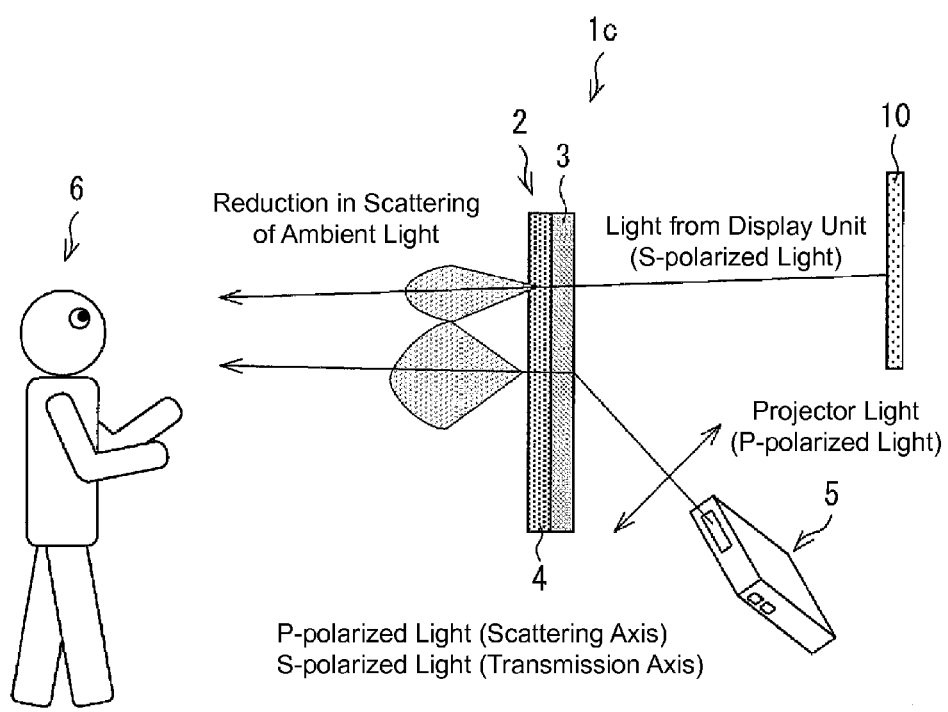
FIG. 8 shows a schematic configuration of a transmissive projection display device according to Embodiment 3.

FIG. 8 illustrates a schematic configuration of the transmissive projection display device 1c.

As shown in FIG. 8, the transmissive projection display device 1c includes on the side of a screen 2 opposite of a viewer 6: a projector 5; and the liquid crystal display panel and the backlight that function as the display unit 10.

The polarizing plate for emitting only s-polarized light is disposed on the topmost surface on the light-exiting surface of the liquid crystal display panel. The projector light from the projector 5 consists of p-polarized light, and the light from the display unit 10 consists of s-polarized light.

Therefore, in a scattering member 4 included in the transmissive projection display device 1c, the projector light from the projector 5 passes along the scattering axis and the light from the display unit 10 passes along the transmission axis. As a result, a wide viewing angle can be ensured with respect to images displayed on the screen 2 in accordance with the projector light, and visual clarity can be ensured with respect to the display unit 10 that can be seen through the screen.

Such a configuration can also easily be applied to a reflective projection display device, which will be described later.

<Embodiment 4>

Next, Embodiment 4 of the present invention will be explained using FIG. 9. A transmissive projection display device 1d of the present embodiment is different from Embodiment 1 in that the display device 1d further includes a lamp 11 that emits s-polarized light. Other configurations are the same as described in Embodiment 1. For ease of description, members that have the same functions as members shown in the drawings of Embodiment 1 will be assigned the same reference characters, and descriptions thereof will be omitted.

Figure 9:
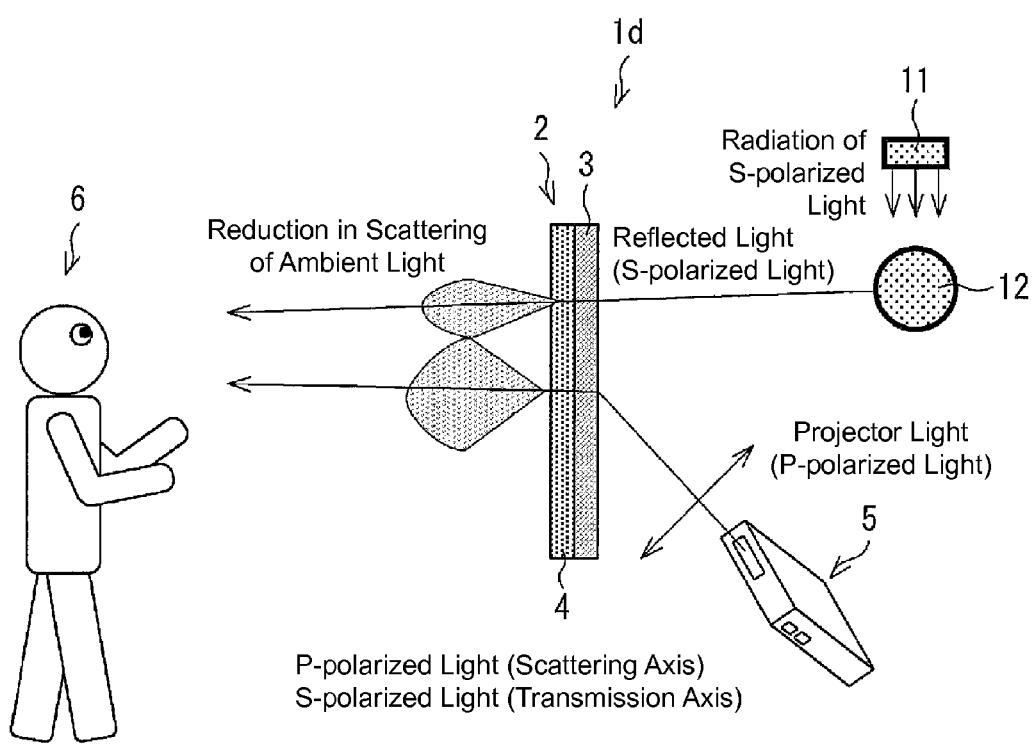
FIG. 9 shows a schematic configuration of a transmissive projection display device according to Embodiment 4.

FIG. 9 illustrates a schematic configuration of the transmissive projection display device 1d.

As shown in FIG. 9, a projector 5 and the lamp 11, which emits s-polarized light, are provided on the side of a screen 2 opposite to a viewer 6.

The s-polarized light emitted by the lamp 11 is reflected by an object 12, and enters a scattering member 4 via a diffraction member 3 as s-polarized light.

As a result of such a configuration that includes a lamp 11 that emits s-polarized light, light that has an even larger s-polarized light component than normal ambient light, which contains a large amount of s-polarized light, can be made to enter the scattering member 4.

Therefore, in the scattering member 4 included in the transmissive projection display device 1d, the projector light from the projector 5 passes along the scattering axis, and reflected light reflected by the object 12 passes along the transmission axis; thus, a wide viewing angle can be obtained for images displayed on the screen 2 in accordance with the projector light and improved visual clarity can be ensured for the object 12 seen through the screen 2.

Such a configuration can also easily be applied to a reflective projection display device, which will be described later.

<Embodiment 5>

Next, Embodiment 5 of the present invention will be described using FIG. 10. A transmissive projection display device 20 of the present embodiment differs from Embodiment 1 in that a $\lambda/2$ retardation plate 23 is provided and light enters the diffraction member 3b after the polarization direction has been rotated 90 degrees. Other configurations are the same as described in Embodiment 1. For ease of description, members that have the same functions as members shown in the drawings of Embodiment 1 will be assigned the same reference characters, and descriptions thereof will be omitted.

Figure 10:
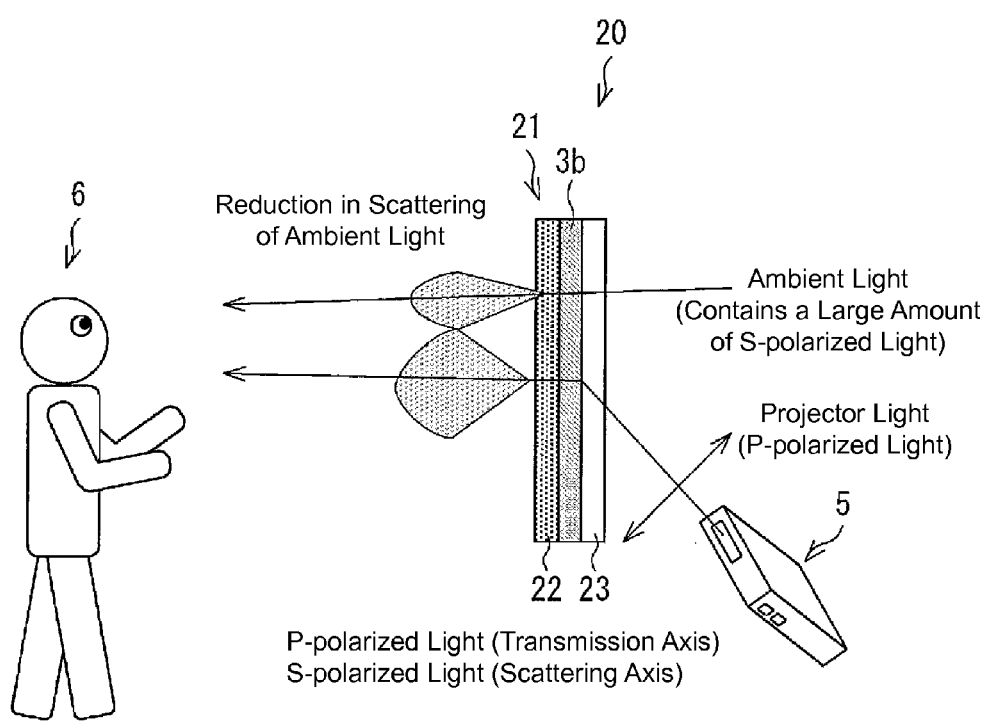
FIG. 10 shows a schematic configuration of a transmissive projection display device according to Embodiment 5.

FIG. 10 illustrates a schematic configuration of the transmissive projection display device 20.

As shown in FIG. 10, a projector 5 is provided on the side of a screen 21 that is opposite to a viewer 6, and the screen 21 has a configuration in which the $\lambda/2$ retardation plate 23, the diffraction member 3b, and a scattering member 22 are successively stacked from the projector 5 side toward the viewer 6 side of the screen 21.

The polarization directions of ambient light that contains a large amount of s-polarized light and the projector light (p-polarized light) from the projector 5 are rotated by 90 degrees upon entering the $\lambda/2$ retardation plate 23, and these two types of light are then emitted as ambient light that contains a large amount of p-polarized light and projector light (s-polarized light).

The ambient light containing a large amount of p-polarized light and the projector light (s-polarized light) then enter the scattering member 22 via the diffraction member 3b.

In the scattering member 22, the p-polarized light passes along the transmission axis and the s-polarized light passes along the scattering axis; thus, most of the ambient light, which is largely p-polarized light, is transmitted and not scattered, whereas the projector light (s-polarized light) is scattered.

Therefore, a wide viewing angle can be obtained for images displayed on the screen 21 in accordance with the projector light, and visual clarity can be ensured through the screen 21.

In the present embodiment, a holographic film, which had a high diffraction efficiency with respect to s-polarized light, was used as the diffraction member 3b. The s-polarized light entered the holographic film as s-polarized light and then exited the holographic film as s-polarized light. In addition, the scattering member 22 was disposed such that the scattering axis of the scattering member 22 matched the polarization axis of the s-polarized light diffracted by the holographic film.

The diffraction efficiency of the diffraction member was polarization-dependent. Thus, upon consideration of the diffraction efficiency of the diffraction member 3b, the projector light was caused to enter the diffraction member 3b after being s-polarized by the λ/2 retardation plate 23 in the present embodiment. Meanwhile, in cases such as Embodiments 1 to 4 in which a holographic film that has a high diffraction efficiency for p-polarized light is used as the diffraction member, the projector light enters the diffraction members 3, 3a as p-polarized light.

<Embodiment 6>

Next, Embodiment 6 of the present invention will be described using FIGS. 11 and 12. A screen 31 included in a transmissive projection display device 30 of the present embodiment differs from Embodiments 1 to 5 in that projector light from the projector 5 enters the diffraction member 3 via the scattering member 4. Other configurations are the same as described in Embodiments 1 to 5. For ease of description, members that have the same functions as members shown in the drawings of Embodiments 1 to 5 will be assigned the same reference characters, and descriptions thereof will be omitted.

Figure 11:
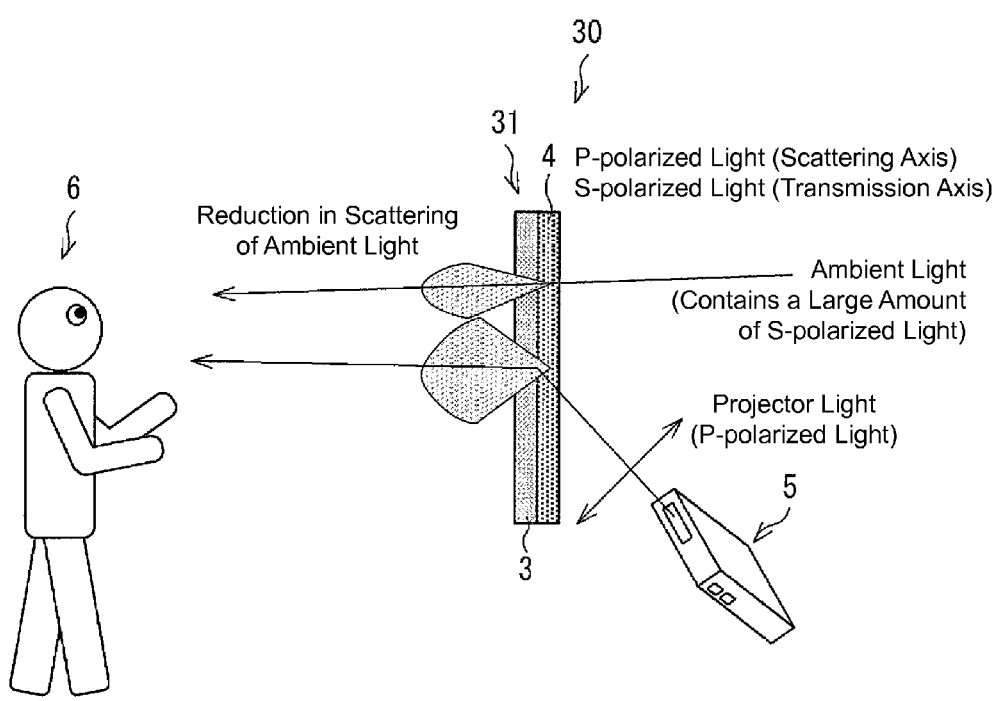
FIG. 11 shows a schematic configuration of a transmissive projection display device according to Embodiment 6.

FIG. 11 shows a schematic configuration of the transmissive projection display device 30.

As shown in FIG. 11, the projector 5 is provided on the side of the screen 31 that is opposite of a viewer 6, and the screen 31 has a configuration in which the scattering member 4 and the diffraction member 3 are successively stacked from the projector 5 side toward the viewer 6 side of the screen 31.

The diffraction member 3 and the scattering member 4 may be bonded using the adhesive agent 7 from Embodiment 1 or the like (not shown).

The projector light from the projector 5 is p-polarized, and the ambient light contains a large amount of s-polarized light. In the scattering member 4, the p-polarized light passes along the scattering axis and the s-polarized light passes along the transmission axis.

Light exiting from the scattering member 4 is then diffracted by the diffraction member 3 and oriented towards the viewer 6.

In such a configuration, when the projector light, which is a laser beam, is caused to enter the scattering member 4 at an angle, the optical path length of the projector light is increased and the scattering member 4 can more effectively scatter light.

Figure 12:
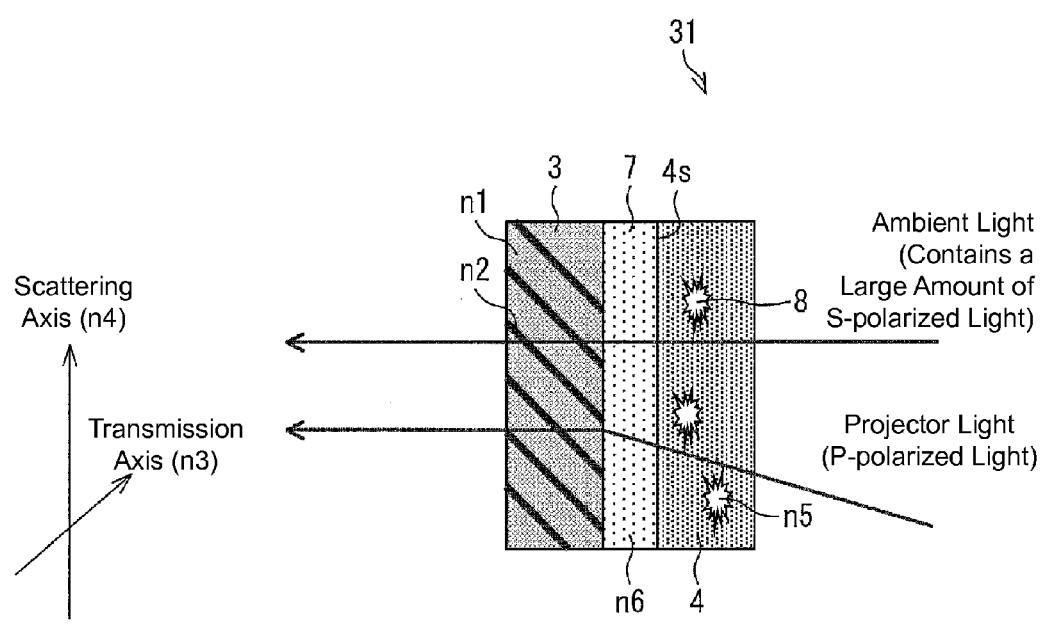
FIG. 12 shows a schematic configuration of a screen included in the transmissive projection display device shown in FIG. 11.

FIG. 12 schematically shows a configuration of the screen 31 that is included in the transmissive projection display device 30 shown in FIG. 11.

As shown in FIG. 12, an adhesive agent 7 with a refractive index n6 is disposed between the diffraction member 3 and the scattering member 4. It is preferable that the difference in the refractive indices be reduced by the adhesive agent 7 and the like in order to reduce the amount of light reflected at the interface of the diffraction member 3 and the scattering member 4.

It is preferable that the refractive index n6 of the adhesive agent 7 satisfy Formula 3 below, and it is even more preferable that the refractive index n6 of the adhesive agent 7 be the same as the refractive index n3 of the scattering member 4 in the transmission axis direction.

$$|n3-n6|<|n4-n6| \qquad \text{Formula 3}$$

Thus, if the refractive index n6 of the adhesive agent 7 satisfies Formula 3 above, it is possible to cause the scattering member 4 to more effectively scatter the projector light from the projector 5 by providing a physical pattern on the front surface 4s on the adhesive agent 7 side of the scattering member 4.

One example of surface treatment that is used for forming the above-mentioned physical pattern is to form parallel vertical lenticular lenses when forming a scattering film as the scattering member 4.

By using such a configuration, it becomes easier to control the viewing angle on the light-exiting side of the screen 31.

<Embodiment 7>

Next, Embodiment 7 of the present invention will be described using FIG. 13. A transmissive projection display device of the present embodiment differs from Embodiments 1 to 6 in that the display device has, instead of the projector 5 in the Embodiments 1 to 6, a projector 5a that includes a wavelength selective polarized light rotational element 24 on the projector light-exiting side. Other configurations are the same as described in Embodiments 1 to 6. For ease of description, members that have the same functions as members shown in the drawings of Embodiments 1 to 6 will be assigned the same reference characters, and descriptions thereof will be omitted.

The projector 5a, which includes the wavelength selective polarized light rotational element 24 on the projector light-exiting side, can also be used in the reflective projection display devices described in Embodiment 8 and subsequent embodiments.

Figure 13:
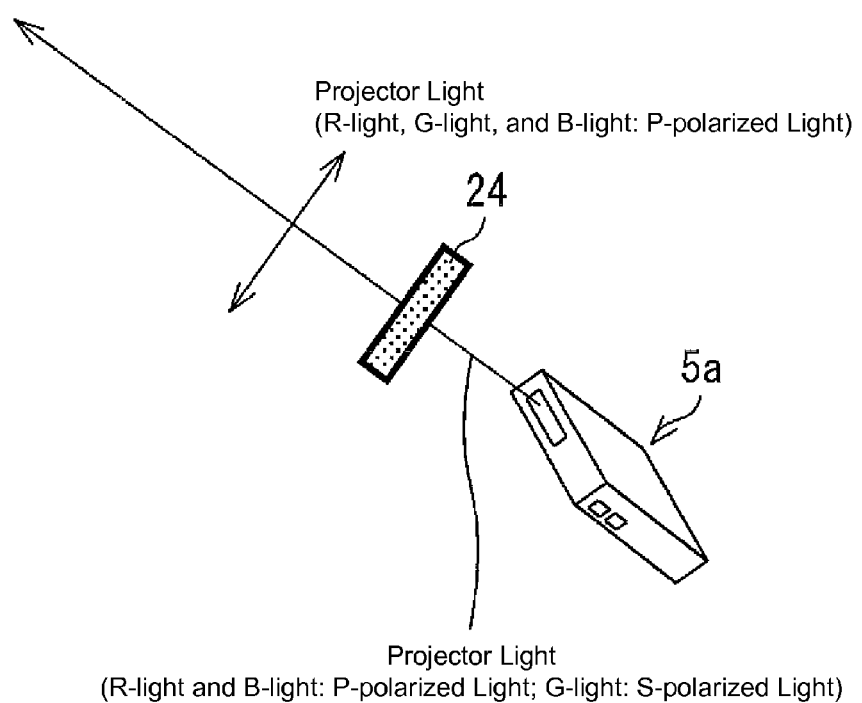
FIG. 13 shows a schematic configuration of a projector, which includes a wavelength selective polarized light rotational element, that can be included in a transmissive or reflective projection display device.

FIG. 13 shows a schematic configuration of the projector 5a that includes the wavelength selective polarized light rotational element 24 on the projector light exiting-side and that can be provided in a transmissive or reflective projection display device.

The projector 5a has a laser light source. In particular, as shown in FIG. 13, there are instances in which the polarization state of the laser projector differs for each of the RGB colors. The R-light and B-light may be p-polarized while the G-light has been rotated 90 degrees and is s-polarized, for example. When such a laser light source is used, the wavelength selective polarized light rotational element 24 can be provided on the light-exiting side of the laser light source, only light with wavelengths that fall within the G-light range can be caused to have the polarization direction thereof rotated 90 degrees, and all of the RGB light emitted from the wavelength selective polarized light rotational element 24 can be caused to be p-polarized light.

In the present embodiment, an example was described in which all of the RGB light emitted from the wavelength selective polarized light rotational element 24 was p-polarized light. However, it is also possible, as necessary, to cause all of the RGB light emitted from the wavelength selective polarized light rotational element 24 to be s-polarized light.

<Embodiment 8>

Next, Embodiment 8 of the present invention will be described using FIGS. 14 and 15. A projection display device of the present invention differs from Embodiments 1 to 6 in that the display device is a reflective display device. Other configurations are the same as described in Embodiments 1 to 6. For ease of description, members that have the same functions as members shown in the drawings of Embodiments 1 to 6 will be assigned the same reference characters, and descriptions thereof will be omitted.

Figure 14:
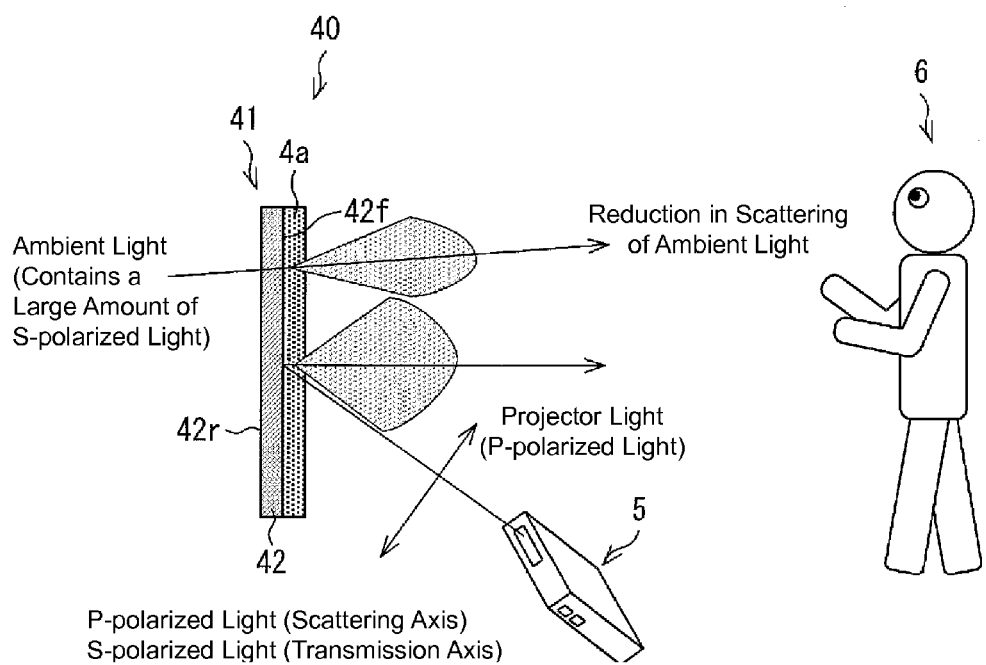
FIG. 14 shows a schematic configuration of a reflective projection display device according to Embodiment 8.

FIG. 14 shows a schematic configuration of a reflective projection display device 40.

As shown in FIG. 14, the reflective projection display device 40 includes: a screen 41, and a projector 5 provided on one side of the screen 41.

Since the display device is a reflective projection display device, the projector 5 is disposed on the same side of the screen 41 as a viewer 6.

The screen 41 includes a scattering film (a polarized light scattering film) that functions as a scattering member 4a, and a holographic film that functions as a diffraction member 42. The scattering film and the holographic film are stacked such that the scattering film is disposed closer to the projector 5.

Since the holographic film used as the diffraction member 42 is reflective, ambient light that enters from a rear surface 42r of the diffraction member 42 exits from a front surface 42f of the diffraction member 42 without being diffracted, whereas projector light, which is from the projector 5, that enters the front surface 42f of the diffraction member 42 via the scattering member 4a is diffracted by the diffraction member 42 and reflected toward the viewer 6.

Thus, as a result of the properties of the reflective projection display device, the projector light passes through the scattering film, which functions as the scattering member 4a, twice.

Figure 15:
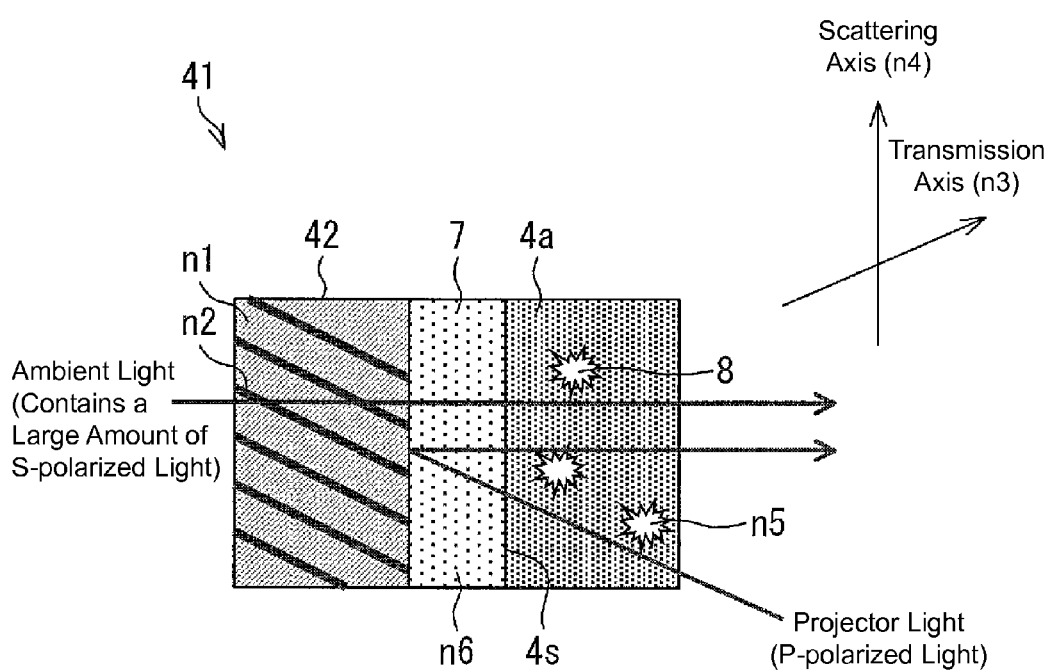
FIG. 15 shows a schematic configuration of a screen included in the reflective projection display device shown in FIG. 14.

FIG. 15 shows a schematic configuration of the screen 41 included in the reflective projection display device 40.

As shown in FIG. 15, a hologram is used as the diffraction member 42 in the present embodiment. The hologram has a structure in which two layers with different refractive indices (n1 and n2) have been stacked, and diffraction occurs as a result of this difference.

An adhesive agent 7, in which the refractive index is n6, is provided between the diffraction member 42 and the scattering member 4a.

In addition, in the scattering film (polarized light scattering film) that functions as the scattering member 4a, the refractive index is anisotropic. The base material of the scattering film has a refractive index n3 in the transmission axis direction in FIG. 15 and a refractive index n4 in the scattering axis direction in FIG. 15.

As a result of the fact that light-scattering microparticles 8 with a refractive index of n5 exist within such a film in which the refractive index is anisotropic, the film has the ability to scatter polarized light.

As a result of the properties of the reflective projection display device, the projector light passes through the scattering film, which functions as the scattering member 4a, twice; thus the degree of scattering along the scattering axis of the scattering member 4a can be set lower than the degree of scattering along the scattering axis of the scattering members 4a described in Embodiments 1 to 6.

In addition, the adhesive agent 7 with a refractive index of n6 is provided between the diffraction member 42 and the scattering member 4a. In order to reduce the amount of light reflected at the interface of the diffraction member 42 and the scattering member 4a, it is preferable that the difference in the refractive indices be reduced by the adhesive agent 7 and the like.

Upon consideration of the polarized light scattering anisotropic properties of the scattering member 4a, it is more preferable that the effect of the interface on the transmission axis be reduced, and thus the scattering axis may be configured so as to be more largely affected by the interface. In fact, it is possible to further promote light scattering by increasing the effect of the interface along the scattering axis.

It is preferable that the refractive index n6 of the adhesive agent 7 satisfy Formula 4 below, and it is even more preferable that the refractive index n6 of the adhesive agent 7 be the same as the refractive index n3 of the scattering member 4a in the transmission axis direction.

$$|n3-n6|<|n4-n6|$$  Formula 4

Thus, if the refractive index n6 of the adhesive agent 7 satisfies Formula 4 above, by providing a physical pattern on a front surface 4s on the adhesive agent 7 side of the scattering member 4a, it is possible to cause the scattering member 4a to more effectively scatter the projector light from the projector 5.

One example of surface treatment that is used for forming the above-mentioned physical pattern is to form parallel vertical lenticular lenses when forming a scattering film as the scattering member 4a (see FIG. 5).

In this way, by providing parallel vertical lenticular lenses on the front surface 4s on the adhesive agent 7 side of the scattering member 4a, lens action can be effectively carried out on polarized light (in other words, projector light [p-polarized light] from the projector 5) in the scattering axis direction; thus, it is possible to efficiently increase the viewing angle in the horizontal direction.

In the present embodiment, the hologram used as the diffraction member 42 is provided with a protective film (not shown in FIGS. 14 and 15) to increase strength and reliability. This protective film may be disposed on the hologram via an adhesive.

As a result of the properties of such a reflective projection display device 40, the degree of scattering along the scattering axis of the scattering member 4a can be set lower than the degree of scattering along the scattering axis of the scattering members 4 described in Embodiments 1 to 6; thus, such a reflective projection display device 40 is beneficial since visual clarity through the screen 41 is improved.

In addition, since the holographic film used as the diffraction member 42 is reflective, manufacturing the film is relatively easy.

Thus, the reflective projection display device 40 has the above-mentioned two benefits when compared to a transmissive projection display device.

As mentioned above, in Embodiment 1, the Fresnel reflectance of p-polarized light is smaller than that of s-polarized light when light enters the screen; thus, similar to transmissive projective display devices, it is preferable that in the reflective projection display device of the present embodiment the projector light from the projector 5 be p-polarized light.

Blazed grating or the like may be used as the diffraction member 42. However, in order to ensure visual clarity, it is preferable that in the present embodiment a holographic film be used as the diffraction member 42.

In addition, it is preferable that the holographic film simultaneously have both a prescribed diffraction function and a scattering function. As a result of such a configuration, the polarized light scattering anisotropic properties (properties in which the degree of scattering varies according to the polarization direction of the light) in the scattering member 4a can be reduced, and such a configuration is also beneficial in that visual clarity is improved.

<Embodiment 9>

Next, Embodiment 9 of the present invention will be described using FIG. 16. A reflective projection display device 50 of the present embodiment differs from Embodiment 8 in that λ/2 retardation plates 23 are provided on both faces of a screen 51 included in the projection display device 50. Other configurations are the same as described in Embodiment 8. For ease of description, members that have the same functions as members shown in the drawings of Embodiment 8 will be assigned the same reference characters, and descriptions thereof will be omitted.

Figure 16:
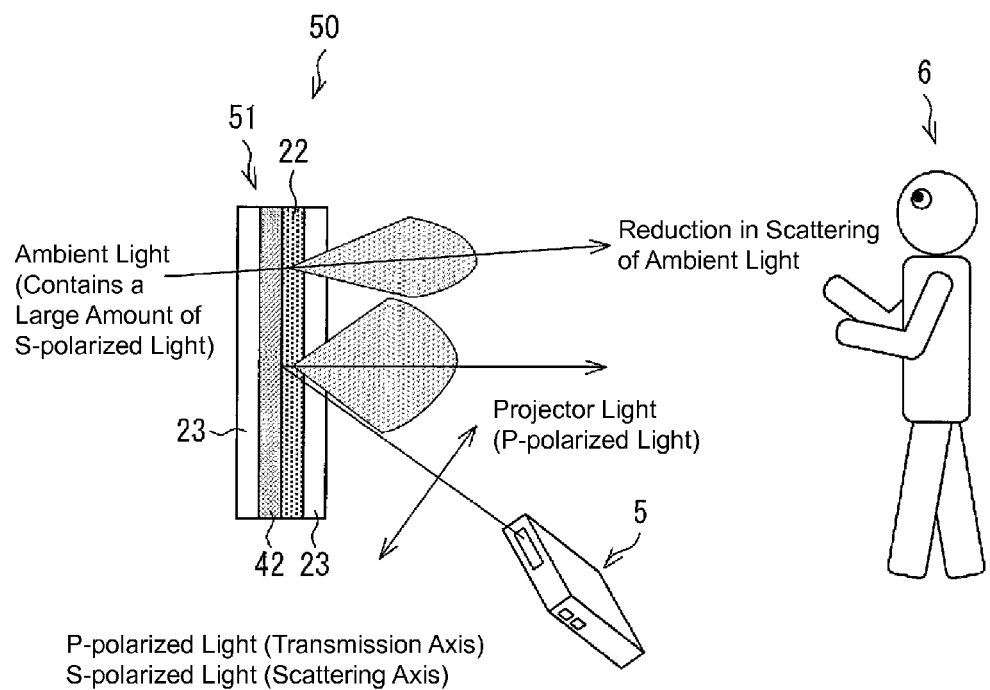
FIG. 16 shows a schematic configuration of a reflective projection display device according to Embodiment 9.

FIG. 16 shows a schematic configuration of the reflective projection display device 50.

As shown in FIG. 16, since the display device is a reflective projection display device, a projector 5 is disposed on the same side of the screen 51 as a viewer 6.

The screen 51 is configured such that: a λ/2 retardation plate 23, a holographic film that functions as a diffraction member 42, a scattering film (polarized light scattering film) that functions as a scattering member 22, and a λ/2 retardation plate 23 are successively stacked from a side of the screen 51 opposite of the viewer 6.

The scattering member 22 is configured such that p-polarized light passes along a transmission axis and s-polarized light passes along a scattering axis.

Therefore, when ambient light, which is mainly s-polarized light, enters the λ/2 retardation plate 23 disposed on the diffraction member 42 side of the screen 51, the polarization direction of the light rotates 90 degrees, thereby causing the ambient light to be mainly p-polarized light. After this occurs, the ambient light enters the scattering member 22 via the diffraction member 42. In addition, since p-polarized light passes along the transmission axis of the scattering member 22, the ambient light, which is now mainly p-polarized light, is transmitted through the scattering member 22 without being scattered. The polarization direction of this light is once again rotated 90 degrees by the λ/2 retardation plate 23 disposed on the scattering member 22 side of the screen, and the light is emitted from the screen 51 as ambient light that is mainly s-polarized light.

Meanwhile, the polarization direction of projector light (p-polarized light) from the projector 5 is rotated 90 degrees by the λ/2 retardation plate 23 disposed on the scattering member 22 side of the screen 51, and enters the scattering member 22 as s-polarized light. Since s-polarized light passes along the scattering axis in the scattering member 22, s-polarized light enters the diffraction member 42 in a scattered state. This light is reflected by the diffraction member 42 and once again enters the λ/2 retardation plate 23 disposed on the scattering member 22 side of the screen. After the polarization direction of the light has been rotated 90 degrees by the λ/2 retardation plate 23, the light is emitted from the screen 51 as p-polarized light.

Therefore, according to such a configuration, a wide viewing angle can be obtained for images displayed on the screen 51 in accordance with the projector light, and visual clarity can be ensured through the screen 51.

In the present embodiment, a holographic film, which had a high diffraction efficiency with respect to s-polarized light, was used as the diffraction member 42. The s-polarized light entered the holographic film as s-polarized light and was reflected by the holographic film as s-polarized light. In addition, the scattering member 22 was disposed such that the scattering axis of the scattering member 22 matched the polarization axis of the s-polarized light reflected by the holographic film.

In other words, since the diffraction efficiency of the diffraction member was polarization-dependent, upon consideration of the diffraction efficiency of the diffraction member 42, the p-polarized projector light in the present embodiment was caused to enter the diffraction member 42 after being s-polarized by the λ/2 retardation plate 23.

Embodiment 10

Next, Embodiment 10 of the present invention will be described using FIG. 17. A reflective projection display device 40a of the present invention differs from Embodiment 8 in that, in the holographic film used as the diffraction member 42a, the diffraction direction of projector light from the projector 5 is inclined 5 to 45 degrees up or down, for example. Other configurations are the same as described in Embodiment 8. For ease of description, members that have the same functions as members shown in the drawings of Embodiment 8 will be assigned the same reference characters, and descriptions thereof will be omitted.

As in the above-mentioned Embodiment 8, when light from a highly directive laser light source used in the projector 5 is substantially reflected by the diffraction member 42 in a direction perpendicular to a screen 41, the light is not scattered, and an especially bright region, which may be too bright for a viewer, appears within a narrow region (within 1 degree) in the front direction of the screen.

The reflective projection display device 40a of the present embodiment can suppress the appearance of such a bright region.

Figure 17:
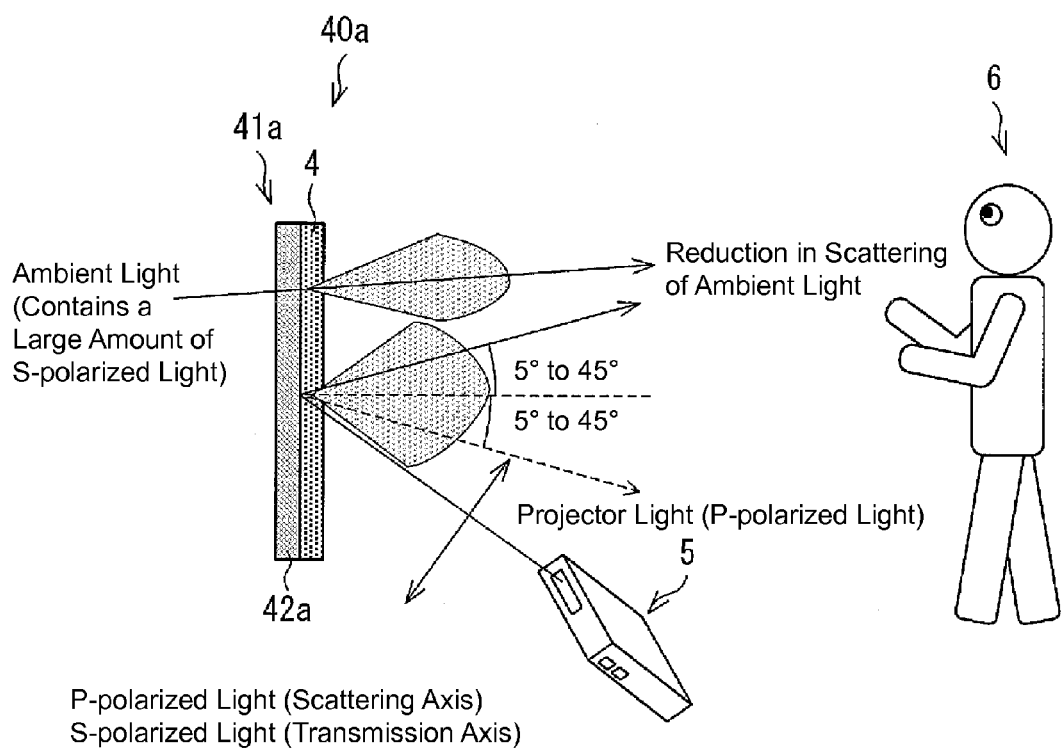
FIG. 17 shows a schematic configuration of a reflective projection display device according to Embodiment 10.
Figure 18:
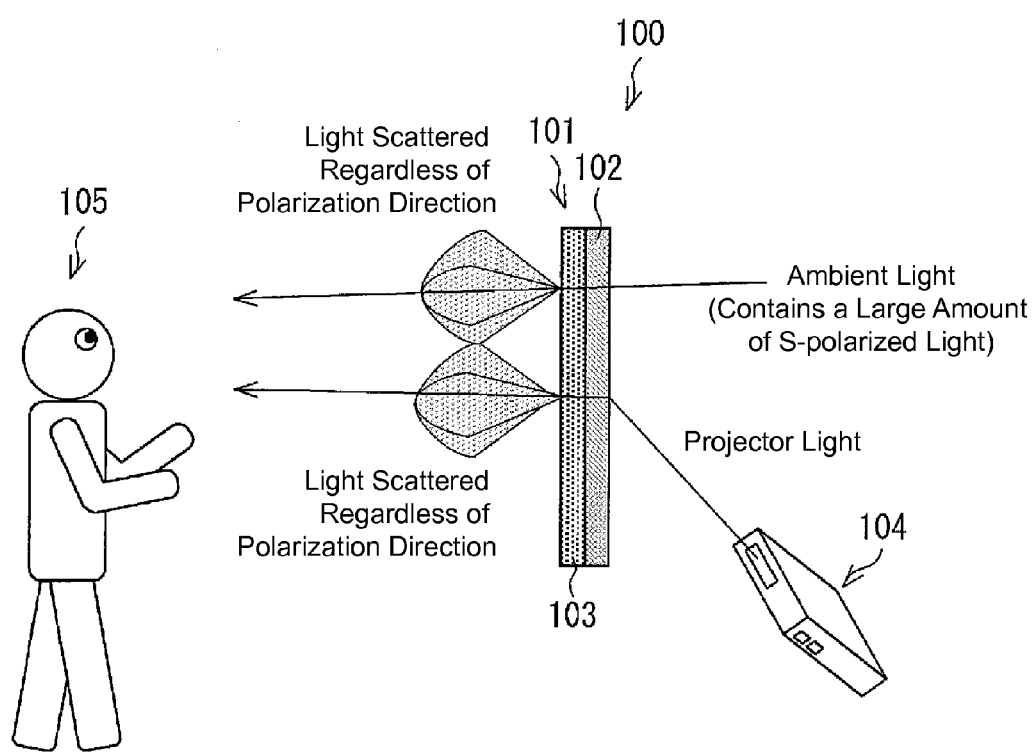
FIG. 18 shows a schematic configuration of a conventional transmissive projection display device.
Figure 19:
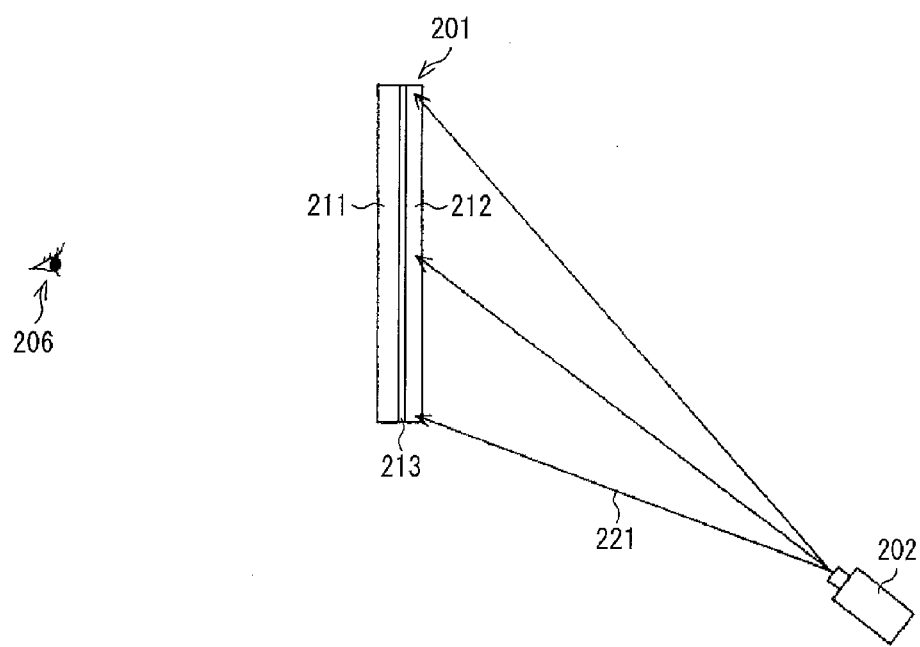
FIG. 19 shows a schematic configuration of a conventional holographic screen disclosed in Patent Document 1.

FIG. 17 shows a schematic configuration of the reflective projection display device 40a.

As shown in FIG. 17, in the holographic film that functions as the diffraction member 42a, the diffraction (reflective) direction of projector light from the projector 5 is inclined between 5 and 45 degrees up or down with respect to a direction perpendicular to the screen 41a, for example.

In such a configuration, by configuring the peak brightness so as to be inclined by at least 5 degrees up or down so that a viewer 6 is not directly facing the peak brightness, it is possible to prevent the appearance of especially bright regions, which the viewer 6 might consider to be too bright, that appear within a narrow region (1 degree or less) of the front direction of the screen 41a.

In order to prevent the appearance of especially bright regions, it is preferable that the diffraction direction of projector light from the projector 5 be inclined by at least 5 degrees up or down with respect to a direction perpendicular to the screen 41a. However, in consideration of issues such as balancing the brightness in the front direction of the screen 41a, the angle may be appropriately set anywhere between 5 and 45 degrees up or down. When the angle is greater than 45 degrees up or down with respect to a direction perpendicular to the screen 41a, the brightness in the front direction decreases, leading to problems with the usage efficiency of the light.

The present invention is not limited to the embodiments described above, and various modifications can be made without departing from the scope of the claims. Therefore, embodiments obtained by appropriately combining the techniques disclosed in different embodiments are included within the technical scope of the present invention.

SUMMARY

A display device according to a first aspect of the present invention includes: an image light projection unit that projects image light; and a screen that transmits or reflects the image light and makes the image light visible to a viewer. The screen includes a diffraction member and a scattering member. The diffraction member selectively diffracts image light and orients the image light toward the viewer. The degree of scattering within the scattering member varies according to the polarization direction of light such that the degree of scattering is higher for image light than ambient light that enters the scattering member from a side that is opposite to the viewer.

According to the above-mentioned configuration, it is possible to produce a display device that can be relatively easily manufactured without concern for the positional relationship of the screen and the image light projection unit that projects image light, and that includes a screen that can ensure brightness in the front direction of the screen, obtain a wide viewing angle, and ensure visual clarity through the screen.

In a display device according to a second aspect of the present invention, image light is transmitted through the screen and seen by the viewer. The image light enters the scattering member via the diffraction member.

According to such a configuration, image light projected by the image light projection unit is scattered by the scattering member after first being oriented toward the viewer by the diffraction member; thus, the image light can be effectively and homogeneously scattered with respect to a direction perpendicular to the screen.

In a display device according to a third aspect of the present invention, the image light is transmitted through the screen and seen by the viewer. The image light enters the diffraction member via the scattering member.

According to such a configuration, even when a highly directive laser beam or the like is used as the light source for the image light projection unit, the laser beam can be made to enter the scattering member at an angle, the optical path length of the laser beam can be increased, and the scattering member can more effectively scatter light.

In a display device according to a fourth aspect of the present invention, the image light is reflected by the screen and seen by the viewer. The image light enters the diffraction member via the scattering member, and the image light that enters the diffraction member is diffracted and once again enters the scattering member.

According to such a configuration, as a result of the properties of a reflective display device, the image light passes through the scattering member twice; thus the degree of scattering along the scattering axis of the scattering member can be set correspondingly lower, and visual clarity through the screen can be improved.

In a display device according to a fifth aspect of the present invention, the image light projected onto the screen is p-polarized light.

It is well-known that if the angle of incidence, which is the angle formed between the incident light and a direction perpendicular to the screen, is greater than or equal to a prescribed angle, the Fresnel reflectance when the light enters the screen will be smaller for p-polarized light than s-polarized light.

Therefore, according to the above-mentioned configuration, since the image light projected onto the screen is p-polarized light, Fresnel reflectance can be suppressed when the image light enters the diffraction member and the scattering member included in the screen, and thus the light usage efficiency can be increased.

In a display device according to a sixth aspect of the present invention, an adhesive agent with a refractive index n6 is disposed between the diffraction member and the scattering member. The scattering member has a transmission axis and a scattering axis in which the respective degrees of scattering vary according to the polarization direction of the light. When the refractive index along the transmission axis is n3 and the refractive index along the scattering axis is n4, the device is configured such that the refractive index n6 of the adhesive agent, the refractive index n3 along the transmission axis of the scattering member, and the refractive index n4 along the scattering axis of the scattering member satisfy the following relationship: $|n3-n6|<|n4n-6|$.

According the above-mentioned configuration, the effect of the interface between the adhesive agent and the scattering member along the transmission axis can be mitigated. As a result of the interface between the adhesive agent and the scattering member having a greater effect along the scattering axis, it is possible to further promote scattering.

Thus, a display device can be realized which has a wider viewing angle and in which visual clarity through the screen is improved.

In a display device according to a seventh aspect of the present invention, a light distribution control member is disposed on the front surface of the adhesive agent side of the scattering member.

According to such a configuration, it is possible to efficiently widen the viewing angle.

In a display device according to an eighth aspect of the present embodiment, the diffraction member is a holographic film.

According to such a configuration, visual clarity through the screen can be improved.

In a display device according to a ninth aspect of the present invention, the diffraction member is provided with a scattering function.

According to such a configuration, as the scattering function of the diffraction member increases, the scattering function of the scattering member can be reduced; thus a display can be realized in which visual clarity through the screen can be increased.

A display device according to a tenth aspect of the present invention is a transmissive projection display device, and is configured such that image light and ambient light enter the diffraction member via a $\lambda/2$ retardation plate.

According to such a configuration, even if the diffraction efficiency of the diffraction member is polarization-dependent, by using the above-mentioned $\lambda/2$ retardation plate, the image light can be changed to polarized light that has a higher diffraction efficiency before entering the diffraction member.

In a display device according to an eleventh aspect of the present invention, the image light is diffracted by the diffraction member by at least 5 degrees up or down with respect to a direction perpendicular to the screen.

According to such a configuration, the device can be configured such that the peak brightness is inclined by at least 5 degrees up or down so that the viewer is not directly facing the peak brightness. Thus, especially bright regions, which the viewer might consider to be too bright, that appear within a narrow region (1 degree or less) of the front direction the screen can be prevented from appearing.

A display device according to a twelfth aspect of the present invention is a transmissive projection display device. A $\lambda/4$ retardation plate is provided on the front surface of the side of the screen facing the viewer.

According to such a configuration, light emitted from the $\lambda/4$ retardation plate can be circularly-polarized, and the effect of polarized sunglasses on visibility can be mitigated.

A display device according to a thirteenth aspect of the present invention is a reflective projection display device in which $\lambda/2$ retardation plates are provided on both the front surface and the rear surface of the screen.

According to such a configuration, even if the diffraction efficiency of the diffraction member is polarization-dependent, the image light can be changed to polarized light before entering the diffraction member by utilizing the $\lambda/2$ retardation plates.

In a display device according to a fourteenth aspect of the present invention, a polarized light rotational element, which selectively rotates the polarization direction of light within a specific wavelength range, is provided in the image light projection unit.

According to such a configuration, in cases such as when the polarization state of the image light from the image light projection unit differs for the various RBG colors, for example, the polarization state of the image light can be matched by using the polarized light rotational element.

In a display device according to a fifteenth aspect of the present invention, a display unit, which performs display by emitting s-polarized light, is provided on the side of the screen opposite of the viewer.

The s-polarized light emitted from the display unit is contained within the above-mentioned ambient light. According to the above-mentioned configuration, visual clarity can be ensured with respect to the display unit visible through the screen.

In a display device according to a sixteenth aspect of the present invention, a lamp, which emits s-polarized light toward an object, is provided on the side of the screen opposite of the viewer.

The s-polarized light emitted from the lamp is contained within the ambient light. As a result of the device being configured to include a lamp that emits s-polarized light, the ambient light can be made to have an even larger s-polarization component than normal ambient light, which already contains a large amount of s-polarized light.

Therefore, improved visual clarity can be ensured for objects visible through the screen.

INDUSTRIAL APPLICABILITY

The present invention can be suitably applied to a transmissive or reflective projection display device that includes a screen.

DESCRIPTION OF REFERENCE CHARACTERS 1 transmissive projection display device
1a transmissive projection display device
1b transmissive projection display device
1c transmissive projection display device
1d transmissive projection display device
2 screen
2a screen
2b screen
3 diffraction member
3a diffraction member
3b diffraction member
4 scattering member
4a scattering member
4s front surface on adhesive agent side of scattering member
4L lenticular lens (light distribution control member)
5 projector (image light projection unit)
5a projector (image light projection unit)
6 viewer
7 adhesive agent
8 light-scattering microparticle
9 retardation plate ($\lambda/4$ plate)
10 display unit
11 lamp
12 object
20 transmissive projection display device
21 screen
22 scattering member
$\lambda/2$ retardation plate
24 wavelength selective polarized light rotational element (polarized light rotational element)
30 transmissive projection display device
31 screen
40 reflective projection display device
40a reflective projection display device
41 screen
41a screen
42 diffraction member
42a diffraction member
50 reflective projection display device
51 screen

What is claimed is:

1. A display device, comprising:
   a projector that projects image light; and
   a screen that receives the image light from the projector and transmits or reflects said image light towards a viewer so as to make an image formed by said image light visible to the viewer,
   wherein said screen includes a diffraction sheet and a scattering sheet, said diffraction sheet diffracting said image light from the projector and directing the image light toward the viewer, and
   wherein the scattering sheet and the projector are configured such that a degree of scattering at the scattering sheet varies according to a polarization direction of incoming light and that the degree of scattering is higher for said image light from the projector than for ambient light that enters the scattering sheet from a side of the scattering sheet opposite to a side facing the viewer.

2. The display device according to claim 1,
   wherein said screen transmits said image light to make said image light visible to the viewer, and
   wherein said image light first enters the diffraction sheet and then enters the scattering sheet.

3. The display device according to claim 1,
   wherein said screen transmits said image light to make said image light visible to the viewer, and
   wherein said image light first enters the scattering sheet and then enters the diffraction sheet.

4. The display device according to claim 1,
   wherein said screen reflects said image light to make said image light visible to the viewer,
   wherein said image light first enters the scattering sheet and then enters the diffraction sheet, and
   wherein the image light that has entered the diffraction sheet is diffracted and once again enters the scattering sheet.

5. The display device according to claim 1, wherein the image light projected onto the screen by the projector is p-polarized light.

6. The display device according to claim 1, wherein said scattering sheet is configured such that a degree of scattering for a p-polarized component of light is higher than a degree of scattering for an s-polarized component of light.

* * * * *